No. 887,903. PATENTED MAY 19, 1908.
L. F. ADT.
EYEGLASSES.
APPLICATION FILED OCT. 19, 1906.
2 SHEETS—SHEET 1.
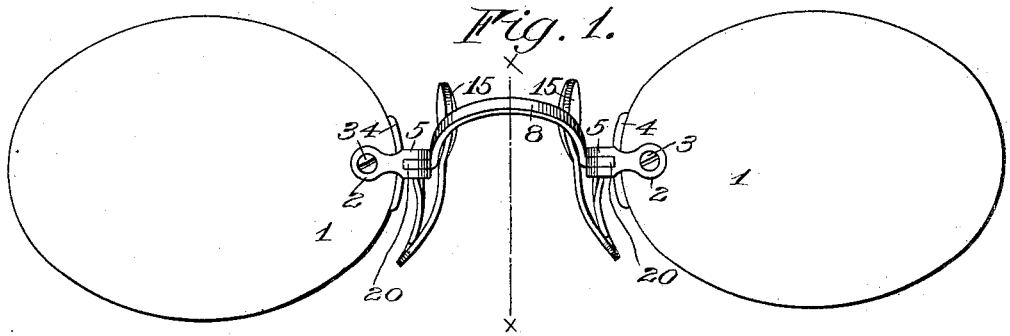
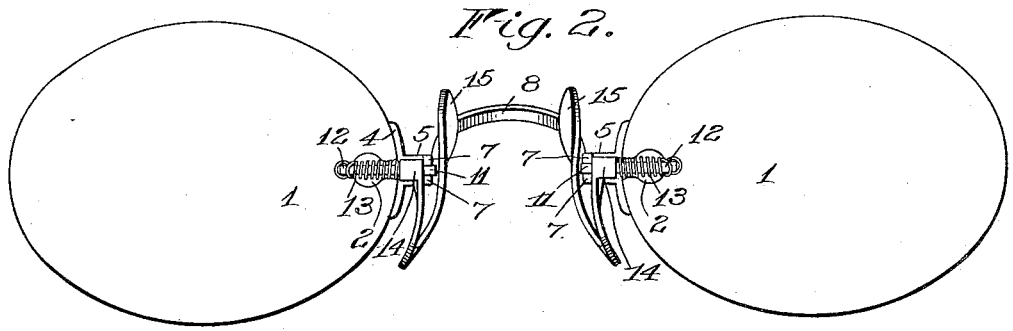
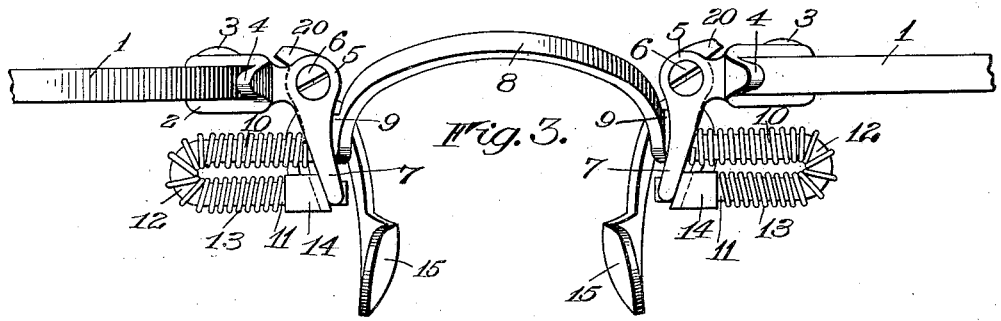

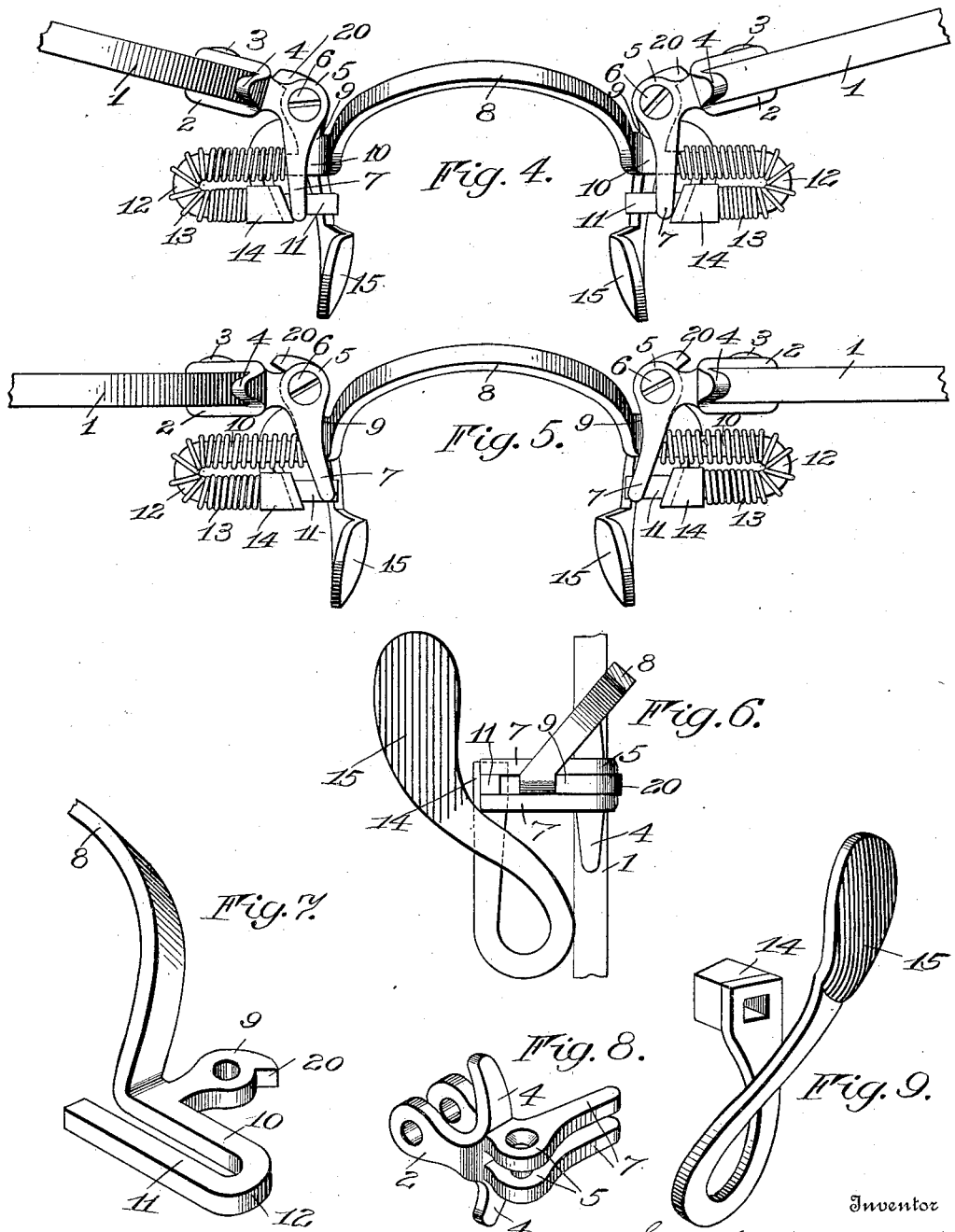

UNITED STATES PATENT OFFICE.

LEO F. ADT, OF ALBANY, NEW YORK.

EYEGLASSES.

No. 887,903. Specification of Letters Patent. Patented May 19, 1908.

Application filed October 19, 1906. Serial No. 339,625.

*To all whom it may concern:*

Be it known that I, LEO F. ADT, of Albany, in the county of Albany and State of New York, have invented certain new and useful Improvements in Eyeglasses; and I do hereby declare the following to be a clear, full, and exact description of the same, reference being had to the accompanying drawings, forming a part of the specification, and to the reference-numerals marked thereon.

My present invention relates to improvements in eyeglass mountings of that class in which a rigid bridge is employed to which the lenses and lens grips are pivotally connected and the nose guards are permitted an independent movement to adjust themselves to the nose of the wearer and it consists in certain improvements hereinafter described, the novel features being pointed out in the claims at the end of this specification.

In the drawings: Figure 1 is a front elevation of a pair of eyeglasses embodying my improvements. Fig. 2 is a rear view of the same. Fig. 3 is a plan view. Fig. 4 is a similar view showing the manner of separating the nose guards for application to the wearer's nose. Fig. 5 is a similar view with glasses in position. Fig. 6 is a sectional view on the line x—x of Fig. 1. Figs. 7, 8 and 9 are perspective views of the parts separated.

Similar reference numerals in the several figures indicate similar parts.

The lenses indicated by 1 are each provided at their inner edges with lens grips or clamps adapted to be secured thereto in any suitable manner. Thus in the present instance these grips embody the ears or attaching lugs 2 extending on opposite faces of the lenses and secured by the usual screw 3, and having also the lens edge-bearing lugs 4. Beyond the lenses these grips are each provided with lugs 5 through which passes the screw 6 forming a pivotal connection with the bridge and said lugs are then extended rearwardly of the lenses forming arms 7 adapted to engage and operate the nose guards, as will be described.

The bridge indicated by 8 is formed of relatively rigid material arched at the center to extend over and preferably in contact with the bridge of the wearer's nose, and having near the lower ends of the arched portion the forwardly extending lugs 9 perforated at their forward ends for the passage of the screws 6 pivotally connecting the lens grips to it. The bridge is also provided at each end with two parallel guides 10 and 11 located outwardly beyond the lugs 9 and when the parts are assembled, arranged in rear of and substantially in the same horizontal plane as the attaching lugs 3 of the lens grips, being effectually concealed by the latter when the mounting is viewed from the front. In the present embodiment of my invention each pair of guides 10 and 11 is formed by extending the narrow material of the bridge outwardly from the center and then bending it inwardly again, the rounded bend 12 thus formed being smooth so as not to interfere with the passage over it of the coil springs 13. The guides 11 are preferably angular in cross section to receive and prevent the rotation of correspondingly shaped sleeves or collars 14 upon which the nose guards 15 are secured, these guards in the present construction being formed of a strip of resilient material extending from the sleeve downwardly, forwardly and thence upwardly and having at their upper end the expanded portion or pad. While I prefer this form of guard it is obvious that any other style could be used if desired.

The springs 13 are of light coiled wire and each extends longitudinally of the guides 10 and 11 and around the bend 12 the forward ends resting against the arms 7 of the lens grips and the rear ends against the outer sides of the guard sleeves 14 and as the springs are applied under tension, they will, when the parts are assembled, hold the arms 7 against the lower ends of the arched portion of the bridge, which constitute stops, to limit the inward movement of the lenses and hold them in alinement. At the same time the other ends of the springs bearing against the sleeve on the guards will hold the latter against the outer ends of the arms 7, though permitting them to yield independently of said arms.

From the above construction the operation will be readily understood. In order to apply the glasses to the wearer's nose it is only necessary to tilt the lenses forwardly on their pivots, as shown in Fig. 4, the arms 7 on the lenses separating the guards by sliding them on the guides 11 and against the tension of the springs 13, said springs being also compressed between their point of engagement with the arms 7 and the bends 12 at the ends of the guides. When the guards thus separated are applied to the wearer's nose and the lenses released, the guards are firmly pressed by the springs into contact, holding the bridge rigidly in position, while the lenses are also returned to normal position in alinement, and with their arms 7 against the stops formed by the lower ends of the arch. As shown in Fig. 5, the guards are permitted a yielding movement on the mounting quite independent of the pivotal movement of the lenses though both parts are moved and controlled by the same springs and while it is preferable that these springs 13 be permitted to slide over the bend 12 at the proximate ends of the guides this is immaterial, other constructions for accomplishing the result produced by these springs being possible and within the scope of this invention.

In order to prevent the lenses from being moved too far on their pivots when separating the guards, the lugs 9 are provided with stop projections 20 adapted to engage the lens grips to limit their movement.

The employment of the two guides with a spring or springs encircling them greatly facilitates the assembling of the mounting, as each of the lens grips and parts is attached to the bridge by a single screw, the springs and guards being threaded upon the guides before its application.

The feature of having the guards move in straight guides on the bridge is advantageous, as they always may return to the same position and are not liable to be distorted by repeated applications and removals nor to affect the proper alinement of the lenses.

It will be noted that all of the operating parts of my mounting are not only arranged in rear of the lenses, but are concealed by the lugs on the lens grips when viewed from the front, thus rendering the glasses particularly neat and attractive in appearance.

I claim as my invention:

1. In an eyeglass mounting, the combination with the bridge and a nose guard movable thereon, of a lens grip pivoted to the bridge and engaging the nose guard to move it and a spring mounted on the bridge having one end engaging the lens grip and the other engaging the guard and serving to move both of them relatively to the bridge.

2. In an eyeglass mounting, the combination with the bridge, having a guide thereon, a nose guard sliding longitudinally of the guide, of a lens grip movable on the bridge and engaging the nose guard to move it in one direction only and springs for holding the nose guard and lens grip yieldingly in position.

3. In an eyeglass mounting, the combination with the bridge having guides thereon, and nose guards sliding longitudinally of the guides, of the lens grips movable on the bridge and engaging their respective guards to move them outwardly only and springs for holding the lens grips yieldingly in position on the bridge and also holding the nose guards yieldingly against the lens grips.

4. In an eyeglass mounting, the combination with the bridge having the two guides at one end thereof and the nose guard mounted to slide on one of said guides, of the lens grips movable on the bridge and engaging the guard to move it in one direction only and springs on the guides engaging the lens grip and nose guard to move them in one direction.

5. In an eyeglass mounting, the combination with the bridge having a pair of guides at each end and the nose guards movable longitudinally on one of each pair of said guides, of the lens grips pivoted on the bridge and having portions extending across the guides and engaging the guards, and springs on the guides operating upon the grips and nose guards.

6. In an eyeglass mounting, the combination with the bridge having a pair of guides at each end connected at their outer portions, and a nose guard mounted on one of each pair, of the lens grips pivoted on the bridge and having portions extending across the guides and engaging the guards, and coil springs extending longitudinally of the guides and engaging the nose guards and lens grips at opposite ends.

7. The combination with the bridge having the arched central portion, the forward lugs and the two guides at each end and the guards sliding on the guides, of the lens grips pivoted on the lugs and having the arms and the springs in the guides and engaging the arms and nose guards at opposite ends.

L. F. ADT.

Witnesses:
CHARLES S. ALDRICH,
ISABEL KELLEY.